US005703198A

United States Patent [19]

Twigt et al.

[11] Patent Number: 5,703,198
[45] Date of Patent: Dec. 30, 1997

[54] RADIATION CURABLE BINDER COMPOSITION FOR POWDER PAINT FORMULATIONS

[75] Inventors: Freddy Twigt, Genemuiden; Robert Van Der Linde, Zwolle, both of Netherlands

[73] Assignee: DSM N.V., Heerlen, Netherlands

[21] Appl. No.: 506,615

[22] Filed: Jul. 24, 1995

Related U.S. Application Data

[63] Continuation of Ser. No. 281,972, Jul. 29, 1994, abandoned.

[30] Foreign Application Priority Data

Jul. 30, 1993 [BE] Belgium ................................ 09300794

[51] Int. Cl.⁶ .................................................. C08G 63/52
[52] U.S. Cl. ........................... 528/303; 528/302; 525/69; 525/70; 525/122; 525/123; 521/48; 430/56; 427/355; 427/358; 428/423.1
[58] Field of Search ............................. 525/69, 70, 122, 525/123; 528/272, 303, 302, 423.7; 521/48; 430/56; 427/355, 358; 428/423.7

[56] References Cited

U.S. PATENT DOCUMENTS

| | | | |
|---|---|---|---|
| 3,770,491 | 11/1973 | Spoor et al. | 428/480 |
| 4,749,807 | 6/1988 | Lapin et al. | 526/271 |
| 5,200,490 | 4/1993 | Jaeger et al. | 528/49 |

OTHER PUBLICATIONS

Wittig, M., "Radiation curing of powder coating", Radtech Europe 1993 Conference (2–6 May 1993), pp. 533–544.
WO 91/14745, PCT/GB91/00450, Filed Mar. 26, 1991.
WO 89/10346, PCT/US88/01347, Filed Apr. 21, 1988.

*Primary Examiner*—James J. Seidleck
*Assistant Examiner*—Duc Truong
*Attorney, Agent, or Firm*—Cushman, Darby & Cushman IP Group of Pillsbury Madison & Sutro LLP

[57] ABSTRACT

The invention relates to a radiation curable binder composition for powder paint formulations. The binder composition comprises a) a polymer having a degree of unsaturation between 300 and 1800 grams per mole of unsaturated group (WPU), having a molecular weight Mn between 800 and 6800 and a viscosity between 1 dPas and 800 dPas and b) a crosslinking agent having vinyl ether, vinyl ester or (meth)acrylate functional groups.

The polymer is an unsaturated polyester and/or an unsaturated polyacrylate.

The binder composition can be used in the preparation of powder paint formulations which can be applied to heat-sensitive substrates such as wood and plastic and which can be cured with UV or electron beam radiation.

14 Claims, No Drawings

RADIATION CURABLE BINDER COMPOSITION FOR POWDER PAINT FORMULATIONS

This is a continuation of application Ser. No. 08/281,972, filed on Jul. 29, 1994, which was abandoned upon the filing hereof.

The invention relates to a radiation curable binder composition which can be used in the preparation of powder paint formulations for application on heat-sensitive substrates.

As appears from the article "Overview of the powder coatings market worldwide" by G. Maggiore in Pitture e Vernice Europe 1/92, pp 15–22, the search is ongoing to discover powder paint formulations in which curing causes only a minor thermal load on the substrate and therefore is suited for heat-sensitive substrates such as wood, plastic or construction elements.

It was also stated in the recent 1993 lecture "Radiation curing of powder coating" by Dr. Wittig at the Radtech Europe 1993 Conference (2–6 May 1993), that radiation curable binder compositions (a binder composition is the combination of a resin with a crosslinker) are not yet commercially available.

Specifically, there has been a long-felt need to develop powder coatings that have the desired combination of good shelf life at relatively high temperatures (such as, for example, about 40° C.) on the one hand and a sufficiently low viscosity at a relatively low curing temperature at which curing can take place (so as to attain good flow) on the other.

The object of the invention is to provide a binder composition for powder coatings having a long shelf life at temperatures of, for instance, about 40° C. and lower, a good processability and flow behaviour at temperatures of between, for example, 80° C. and 140° C., and the ability to be cured with radiation so that application of powder paint formulations to heat-sensitive substrates, such as wood.

The term wood as a substrate includes fibre board, MDF (medium density fibre board) or any substrate for of which a significant proportion consists of wood.

The invention is characterized in that the binder composition comprises a) a polymer having a degree of unsaturation between about 300 and 1800 grams per mole of unsaturated group (WPU), having a molecular weight Mn between about 800 and 6800 and a viscosity of between 1 dPas and 800 dPas, and b) a crosslinking agent having vinyl ether, vinyl ester or (meth)acrylate functional groups.

Mn is determined from gel permeation chromatography (GPC) using a polystyrene standard.

The viscosity of the polymer is measured with an Emila rheometer at 165° C. (as described at page 187 of Misev, Powder Coatings, Chemistry and Technology, Wiley 1991).

Some of the advantages of this invention—long shelf life at 40° C., the ability to be radiation curable, and good flow behavior at temperature between about 80° C. and about 140° C.—allow this binder composition to be used in powder paint formulations that can be applied to heat-sensitive substrates.

An advantage for coatings prepared with this binder composition and cured with radiation is that the coated substrate can be immediately stacked. The customary storage of physically dried coatings on wood can be as long as 24 hours.

Another advantage of the present invention is the good cold-check resistance. An important property of wood in comparison with, for instance, metal as a coating substrate is that wood warps, shrinks and expands in response to changes in temperature and relative humidity. Thus, a powder coating that has been applied to a wooden substrate must be both flexible and hard. The cold-check resistance (measured according to ASTM-D-1211-87) is a measure of this flexibility and the coating must withstand at least 100 cycles.

Also, the sandability of the coating obtained is excellent.

Other required properties of the powder coatings prepared from this binder compositions, such as for example hardness (DIN 53157), flow, colour stability, scratch resistance (ISO 1518) and adhesion (DIN 53151) are also excellent.

In the polymer containing unsaturation in an amount of between 300 and 1800 grams per mole of unsaturated group the unsaturated groups can be positioned either within the polymer chain or at the end of the chain.

Unsaturated polyesters, unsaturated polyacrylates and/or mixtures thereof are preferably used as polymer having unsaturated groups.

The unsaturated polyester preferably has a degree of unsaturation between 300 and 1800 grams per mole of unsaturated group (WPU), a molecular weight (Mn) between about 800 and about 6800 and a viscosity between 1 dPas and 350 dPas.

The degree of unsaturation for the unsaturated polyester is preferably between 300 and 600 grams per mole of unsaturated group.

The molecular weight (Mn) is preferably between about 2500 and about 4500.

The unsaturated polyester can be (semi)crystalline or amorphous. Generally, an advantage of crystalline unsaturated polyesters over amorphous unsaturated polyesters is that stable powder coatings with lower viscosity and better flow can be more easily prepared.

In general, the glass transition temperature (Tg) of the amorphous resin is higher than 40° C. Semi-crystalline resins have a Tg and a melting point (Tm) and Tg is lower than Tm.

The melting point of the (semi)crystalline unsaturated polyester is between about 40° C. and about 180° C., and preferably, is between about 60° C. and about 140° C. The melting point and the melting range are discussed at pages 36,286 and 295 of Misev, Powder Coatings, Chemistry and Technology Wiley 1991, the disclosure of which is incorporated herein by reference.

Thermosetting powder coatings that are based on unsaturated polyester are described in Misev, Powder Coatings, Chemistry and Technology, at pages 167–170, the complete disclosure of which is incorporated herein by reference.

Preparation of the unsaturated polyester can be carried out in a one-step process in which unsaturated polyfunctional carboxylic acids and glycols are heated to a temperature, for example, between about 180° C. to about 230° C. for between about 6 hours to about 15 hours.

Preparation of the unsaturated polyester can also be carried out in a two-step process in which saturated glycols and saturated polyfunctional carboxylic acids are esterified in a first step at, for example, between about 230° C. to about 250° for between about 2 hours to about 8 hours. In a second step, saturated or unsaturated glycols and acids, or mixtures thereof, are esterified at, for example between about 180° C. and 220° C. for between about 2 to about 8 hours.

In general, the unsaturated polyester is obtainable from the condensation of one or more aliphatic or cycloaliphatic mono-, di- or polyfunctional alcohols, or mixtures thereof, one or more aliphatic, cycloaliphatic, or aromatic di- or polyfunctional carboxylic acids, or mixtures thereof, and if desired, a monofunctional carboxylic acid or the corresponding ester of this monofunctional carboxylic acid.

Examples of suitable alcohols and glycols include, among others, benzyl alcohol, ethylene glycol, propylene glycol, neopentylglycol, butanediol, hexanediol, dimethylol cyclohexane, diethylene glycol, glycerol, trimethylol propane, pentaerytritol, dipentaerythritol, or mixtures thereof. Instead of an alcohol or glycol, or together with an alcohol or glycol, one or more epoxy compounds such as, for example, ethylene oxide, propylene oxide, allyl glycidyl ether, or mixtures thereof, can be used.

Examples of suitable di- or polyfunctional carboxylic acids include maleic acid, fumaric acid, itaconic acid, citraconic acid, malonic acid, succinic acid, glutaric acid, adipic acid, sebacic acid, 1,4-cyclohexane dicarboxylic acid, hexahydrophthalic acid, hexachloroendomethylenetetrahydrophthalic acid, dichlorophthalic acid, isophthalic acid, terephthalic acid, trimellitic acid, or mixtures thereof.

Fumaric acid, maleic acid, or a mixture thereof, is preferred.

The carboxylic acids can also be applied in the corresponding anhydride form, so that, for example, tetrahydrophthalic anhydride, maleic anhydride, phthalic anhydride, or mixtures thereof can be used.

If desired, the unsaturated polyester can also be obtained from saturated or unsaturated monofunctional carboxylic acids, or mixtures thereof. These monofunctional carboxylic acids include, for example, synthetic or natural fatty acids having 2 to 36 carbon atoms. Corresponding esters of monofunctional alcohols such as glycerol are used for esterification. Examples of suitable monofunctional carboxylic acids include, among others, lauric, stearic, oleic, linoleic, benzoic, acrylic, methacrylic acid, or mixtures thereof. The unsaturated polyester can also contain dicyclopentadiene.

In order to encourage crystallization of the polyester, it is desirable, but not required, that the monomers used for polycondensation contain an even number of carbon atoms. Use of cyclic monomers which are symmetrically substituted with high symmetry such as, for example, para-substituted phenyl rings generally promotes crystallinity, as known to those skilled in the art. For example, terephthalic acid, cyclohexane dicarboxylic acid, dimethylolcyclohexane, or mixtures thereof, can be used. Although the melting points of polyester resins based on cyclic monomers with high degrees of symmetry are too high for application on wood, the melting points can be lowered by using these cyclic monomers in combination with linear monomers having general formula $HOOC(CH_2)_nCOOH$ and $HO(CH_2)_nOH$, where n is an even number in the range of 2 to 12.

Monomers useful for promoting crystallinity in the semi-crystalline polyester preferably have an even number of carbon atoms, as is known to those skilled in the art. Examples include terephthalic acid, isophthalic acid, adipic acid, cyclohexane dicarboxylic acid, hexanediol, butanediol, neopentylglycol ester of hydroxypivalic acid ("esterdiol"), dimethylol cyclohexane, or mixtures thereof. Preparation of semicrystalline polyesters is described in, for example, WO-A-91-14,745, the complete disclosure of which is incorporated herein by reference.

If the unsaturated polyester is hydroxyl-functionalized, then the hydroxyl number of the polyester is usually between about 18 mg KOH/gram of resin and about 75 mg KOH/gram of resin, and preferably, is between 25 mg KOH/gram of resin and about 45 mg KOH/gram of resin.

If the unsaturated polyester is acid-functionalized, the acid number is usually between about 18 mg KOH/gram of resin and about 75 mg KOH/gram of resin, and preferably, between about 25 mg KOH/gram of resin and about 45 mg KOH/gram of resin.

Suitable acrylate polymers include, for instance, acrylate polymers having several side chains containing unsaturated groups.

These polymers can be obtained by means of a two-step process. In the first step an acrylate polymer is prepared by a conventional polymerization process, in which also a certain proportion of functional monomer is copolymerized to obtain a functionalized acrylate polymer. This functional monomer, which usually is present in amounts of between 3 and 60 wt. %, can be, for example, an epoxy functionalized monomer such as glycidyl (meth)acrylate; an acid functionalized monomer such as, for instance, (meth)acrylic acid, a hydroxy functionalized monomer such as, for instance hydroxyethyl(meth)acrylate; or an isocyanate functionalized monomer such as, for instance, TMI (metha-isopropenyl-α-α-dimethylbenzyl-isocyanate) which can be obtained from the American Cyanamid Co.

In the second step for the acrylate synthesis, an addition reaction is carried out between the functional groups of the acrylate polymer which is prepared in the first step and a compound having both a functional group capable of reacting with the functional groups and also an unsaturated group in the side chain.

For the addition reaction of this second step, the functionalized acrylate resin can be dissolved in a solvent such as for example toluene, xylene and/or butyl acetate. The compound having the unsaturated group, is added at temperatures between, for example, 50° C. and 150° C. and next, stirring takes place for some hours. Progress of the reaction can be monitored by means of titrations of, for instance, acid groups or isocyanate groups. Addition reactions of this second step are, for instance, between a compound having an acid group and an epoxy functional acrylate polymer, a compound having a hydroxyl group and an isocyanate functionalized acrylate polymer, a compound having an isocyanate group and a hydroxyl functionalized acrylate polymer, a compound having an anhydride group and a hydroxyl functionalized acrylate polymer or a compound having an epoxy group and an acid functionalized acrylate polymer.

It is preferred to allow an epoxy functionalized acrylate polymer to react with (meth)acrylic acid.

The unsaturated side chain can have, for example, methacrylate ester, allyl, vinyl, vinyl ether, or anhydride groups, or mixtures thereof. Suitable compounds that are allowed to react with the functionalized acrylate copolymer are, for example, methacrylic acid, glycidyl methacrylate TMI, allylglycidyl ether, hydroxybutylvinyl ether, maleic anhydride, or mixtures thereof.

The unsaturated acrylate polymer can also be obtained by means of a multi-step process. For example, one of the isocyanate groups of a diisocyanate compound such as, for example, isophorone diisocyanate (IPDI), hexamethylene diisocyanate (HDI) or methylenebiscyclohexylisocyanate ($H_{12}MDI$) is allowed to react with a methacrylate monomer having the hydroxyl functionality. The resulting urethane compound, which contains isocyanate and methacrylate groups for further reaction, can subsequently be allowed to react with, for example, an acrylate copolymer having the hydroxyl functionality. This acrylate copolymer can be prepared using, for example, hydroxyethyl methacrylate as a functionalized monomer.

The crosslinking agent for the radiation curable binder composition according to the present invention is preferably an oligomer or polymer having vinyl ether, vinyl ester, or methacrylate groups. More preferably an oligomer or polymer having vinylether groups is applied.

The crosslinking agent having vinyl ether groups is preferably made of a divinyl ether functionalized urethane based on, for example, hexanediisocyanate and hydroxybutyl or hydroxyethyl vinyl ether.

The crosslinking agent having methacrylic groups is preferably made of a dimethacrylate functionalized urethane based on, for example, hexanediisocyanate and hydroxyethyl methacrylate.

Suitable difunctional isocyanates used in the preparation of the crosslinking agent include isophorone diisocyanate, or methylene diisocyanate, or methylenebiscyclohexylisocyanate. Functionalized oligomers derived from these diisocyanates such as isocyanurates, uretdiones, and biurets can, for example, also be used.

Preparation of vinyl ether functionalized diurethanes can be carried out by means of the process described, in for example, EP-A-505.803, the complete disclosure of which is incorporated herein by reference.

Preparation of suitable vinyl ether terminated ester oligomers for use as crosslinking agent is described in WO-A-89/10.346, the complete disclosure of which is incorporated herein by reference. A suitable vinyl ester functional compound is, for example, divinyl adipate.

The crosslinking agent preferably contains between about 1 to 10 vinyl groups, and more preferably, contains at least two vinyl groups per molecule.

The crosslinking agent can be a liquid or a solid. Solid crosslinking agents are preferred because good powder stability is more easily achieved, after combination of the crosslinking agent with the unsaturated polymer.

The relative amounts of polymer having unsaturated groups and crosslinking agent in the binder composition depend in part on the choice of crosslinking agent. In general, if the crosslinking agent is vinyl ether functionalized, the equivalent ratio of polymer unsaturation to crosslinking agent unsaturation is between 1:2 and about 2:1, and preferably, about 1:1. In general, if the crosslinking agent is a methacrylate or a vinyl ester functionalized compound, the equivalent ratio of polymer unsaturation to crosslinking agent unsaturation is between about 1:2 and about 2:1, and preferably, about 1:1.3.

Radiation curing is preferably carried out via ultraviolet (UV) or electron beam (EB) curing. These techniques are described in, for example, the article, "UV and EB-curing", by S. J. Bert et al. in Jocca 1990 (11), pgs. 446–453, the complete disclosure of which is incorporated herein by reference. Most preferably UV-curing is applied.

For UV-radiation curing of the powder paint formulation a photoinitiator is mixed with the binder composition at a temperature between, for example, about 90° C. and about 150° C. Mixing can take place in a solvent or in the melt with use of an extruder, wherein the latter is preferred. Pigments, flow promotors, other additives, or mixtures thereof, can also be used. The paint can be applied to the substrate or electrostatically sprayed. The powder paint can be placed in an oven and can be exposed to IR radiation, or a combination of both. The applied powder paints is molten at temperatures between, for example, about 80° C. and about 140° C. to form a continuous, smooth coating with coating thickness between, for example, about 50 μm and about 200 μm. Then, the hot panel is cured with use of a UV light source. Post-heating can also be carried out.

Suitable photoinitiators allow for initiation of the curing process with exposure to light having wavelengths between about 200 nm and about 600 nm. Suitable photoinitiators have ketone functionalities and can be aromatic such as, for example, benzophenone. Darocur 1173® (Merck) is a suitable benzyl-ketal-based photoinitiator, which contains 2-hydroxy-2-methyl-1-phenylpropane-1-one as active component. Irgacure 184® (Ciba) is an aryl ketone containing hydroxycyclohexyl phenyl ketone as active component, and is a suitable photoinitiator. Irgacure 369® (active component 2-benzyl-2-dimethylamino-1-(4-morpholinophenyl)-butanone-1) is also suitable. Acyl phosphines, such as 2,4,6,-trimethylbenzoyl diphenyl phosphone oxide (Lucerine TPO®, BASF) can also be used, as can Quantacute CPTX® (Octel Chemicals), which contains 1-chloro-4-propoxy thioxanthone as active component. Chemical derivatives of photoinitiators are suitable, as are mixtures of photoinitiators. If the above-cited photoinitiators, which are Norfish type I or Norfish type II photoinitiators, are used, additional use of a synergist is customary, as known to those skilled in the art.

A very important advantage of the radiation curing according to the present invention is that flow of the powder paint on exposure to heat is fully divorced from the curing reaction on exposure to UV or electron beam radiation, which enables powder coatings to be made that exhibit excellent flow.

By applying the aforementioned heating and curing techniques, the coating is given a higher temperature than the substrate, resulting in a lower thermal load on the substrate, which is most essential for wood as substrate.

Common additives such as pigments, fillers, flow promoters, stabilizers, or mixtures thereof can be used, as known to those skilled in the art. Suitable pigments include, for example, inorganic pigments such as titanium dioxide, zinc sulphide or iron and chromium oxide, and organic pigments such as azo compounds.

Suitable fillers include, for example, metal oxides, silicates, carbonates, sulfates, or mixtures thereof, as known to those skilled in the art.

GB-A-1360688 relates to a coating system, comprising for example unsaturated polyesters, which can be applied on wood. However, this system is hardenable by ionizing radiation (which does not comprise UV-curing). Furthermore this system does not relate to a powder coating system because it relates to a wet coating system which is unrelated to powder coating systems.

This invention will be further elucidated by a consideration of the following experiments and examples, which are intended to be purely exemplary of the use of the invention.

EXAMPLES

EXPERIMENT 1

Preparation of Unsaturated Polyester

A 3-liter round-bottom flask was provided with a thermometer, a stirrer, and a distillation head and was filled with 10.8 moles of 1,6-hexanediol, 5.1 moles of fumaric acid, 4.9 moles of terephthalic acid, 4.5 mmoles of dibutyl tin oxide, and 3.0 mmoles of mono-tertiary-butyl-hydroquinone.

While supplying a constant flow of nitrogen and distilling water, the temperature was raised to about 225° C. over a period of about 6 hours. After an acid number of less than about 12 mg KOH/g resin was detected, the reaction mixture was cooled to about 180° C. and pumped under vacuum for about one hour.

The resultant unsaturated polyester had a molecular weight, Mn, of about 4,000, a degree of unsaturation (WPU) of about 450 g of polymer per mole of unsaturated group, an acid number of about 0.8 mg KOH/g resin, a viscosity of about 32 dPas, and a melting range of about 40°–95° C. The latter was measured using a Mettler, TA 3000 system and a heating rate of 5° C./min.

Experiment 2

Preparation of Vinyl Ether Functionalized Crosslinking Agent

A 4-liter cylindrical reactor was provided with a thermometer, a stirrer, and a reflux condenser and filled with 3.3 moles of 1,6-hexanediisocyanate, 2.1 mmoles of dibutyl tin laurate, and 1,980 ml of chloroform. While supplying a constant flow of nitrogen to the vessel, 6.6 moles of 4-hydroxybutyl vinyl ether were added drop-wise over the course of about 3 hours, during which time the reaction mixture was heated to about 55° C. After about 8 hours, a sediment had formed, which was filtered, washed with hexane, and dried under vacuum.

The reaction product had a melting range of about 90°–108° C., which was measured using a Mettler TA 3000 system and a heating rate of 5° C/min.

Example I

Curing of Unpigmented Powder Paint with UV Radiation

A mixture of 208 g of polymer having unsaturated groups (prepared as described previously in Experiment 1), 92 g of crosslinking agent (prepared as described previously in Experiment 2), 12 g of Irgacure 184®, and 2 g of an acrylate copolymer (BYK 361® of BYK Chemie) were mixed in a kneader at 150° C. to yield a homogeneous paint formulation.

After cooling the paint formulation, the formulation was ground and sieved, and the fraction of particles having particle size smaller than about 90 µm was deposited onto medium density fiber (MDF) board panels in layers about 60 µm thick using an electrostatic spraying device.

The powder paint was then heated with IR lamps for 60 sec, and the panels were cured on exposure to UV radiation (1 J/cm$^2$, measured with an IL 390 light bug).

The powder coating obtained was tested, and the following results obtained:

| | |
|---|---|
| flow (visually determined) | good |
| appearance (visually determined) | good |
| scratch resistance (ISO 1518) | good |
| acetone resistance | >100 double rubs |
| ability to be sanded | good |
| cold check resistance | >100 cycles, 1 cycle comprising 1 hour at 50° C., 1 hour at −20° C. and 1 hour at 20° C. |
| adhesion (DIN 53151) | good |

Example I demonstrates that the binder composition according to the present invention can be used effectively as a powder paint on medium density fibre board to yield powder coatings having many desirable properties.

While the invention has been described in detail and with reference to specific embodiments thereof, it will be apparent to one of ordinary skill in the art that various changes and modifications can be made therein without departing from the spirit and scope thereof.

We claim:

1. A powder paint containing a radiation curable binder composition for powder paint formulations comprising:

a polymer having unsaturated groups, said polymer having a degree of unsaturation between about 300 grams and about 1,800 grams of polymer per mole of unsaturated group, a molecular weight, Mn, between 800 and 6,800 g/mol, and a viscosity between about 1 dPas and about 800 dPas; and a crosslinking agent having at least two functional groups selected from the group consisting of vinyl ether, vinyl ester, and (meth)acrylate functional groups, wherein said polymer and crosslinking agent are selected so that said composition is in solid particle form.

2. A powder paint according to claim 1, wherein said polymer having unsaturated groups is an unsaturated polyester or an unsaturated polyacrylate.

3. A powder paint according to claim 1, wherein the viscosity is between about 1 dPas and about 350 dPas.

4. A powder paint according to claim 1, wherein said crosslinking agent is a divinyl ether functionalized urethane compound.

5. A process for preparing a wholly or partially coated substrate which comprises applying a powder paint according to claim 1 to a heat sensitive substrate.

6. A process according to claim 5, wherein said heat-sensitive substrate is wood.

7. A process according to claim 5, wherein said process further comprises curing said powder paint with radiation.

8. A process according to claim 7, wherein said radiation is UV radiation.

9. A process according to claim 7, wherein said radiation is an electron beam radiation.

10. A powder coating obtained by curing a powder paint according to claim 1.

11. A substrate that is wholly or partially coated with said powder coating according to claim 10.

12. A powder paint composition which comprises solid particles of a UV or EB radiation-curable binder comprised of (a) a polymer having unsaturated groups wherein said polymer has a degree of unsaturation between about 300 grams and about 1,800 grams of polymer per mole of unsaturated group, a molecular weight (Mn) between about 2500 and 4500 g/mol, and a viscosity between 1 dPas and 350 dPas, and (b) a crosslinking agent having at least two functional groups selected from the group consisting of vinyl ether, vinyl ester, and (meth)acrylate functional groups.

13. A powder paint composition according to claim 12, wherein said compositions contain a photoinitiator.

14. A powder paint according to claim 1, wherein said crosslinking agent comprises vinyl ether or vinyl ester functional groups.

* * * * *